United States Patent [19]

Bouchard et al.

[11] 4,048,546

[45] Sept. 13, 1977

[54] DIELECTRIC POWDER COMPOSITIONS

[75] Inventors: Robert Joseph Bouchard, Wilmington, Del.; Lothar Heinrich Brixner, West Chester, Pa.

[73] Assignee: E. I. Du Pont de Nemours and Company, Wilmington, Del.

[21] Appl. No.: 594,282

[22] Filed: July 9, 1975

[51] Int. Cl.$^2$ .................. C04B 35/00; C04B 35/46; H01G 4/12
[52] U.S. Cl. .................. 361/321; 106/39.5; 106/73.3; 252/62.9; 252/63.2; 252/63.5; 252/520; 252/521; 361/311; 423/593; 423/598
[58] Field of Search .................. 252/520, 521, 63.2, 252/63.5, 62.9 R; 106/73.3, 39.5; 423/598, 593; 317/242, 258

[56] References Cited

U.S. PATENT DOCUMENTS

| | | | |
|---|---|---|---|
| 2,757,792 | 8/1956 | Shioleno | 317/242 |
| 2,777,773 | 1/1957 | Callahan | 423/598 |
| 3,305,394 | 2/1967 | Kaiser et al. | 252/63.2 |
| 3,472,777 | 10/1969 | Brixner | 252/62.9 |
| 3,708,438 | 1/1973 | Levy | 423/598 |
| 3,718,730 | 2/1973 | Frey et al. | 423/598 |

FOREIGN PATENT DOCUMENTS 865,794  3/1971  Canada

OTHER PUBLICATIONS

Krainek et al., Soviet Physics–Solid State, 2, 63–65 (1960).
Smolenskii et al., Soviet Physics–Solid State, 3, 714, 1961.
Zaslavskii et al., Soviet Physics–Crystallography, 7, 577, (1963).

*Primary Examiner*—Mayer Weinblatt
*Assistant Examiner*—John D. Smith

[57] ABSTRACT

Finely divided dielectric powder compositions having the formula $(Sr_xPb_{1-x}TiO_3)_a(PbMg_{0.5}W_{0.5}O_3)_b$ wherein
  $x$ is 0–0.10,
  $a$ is 0.35–0.5,
  $b$ is 0.5–0.65, and
  $a$ plus $b$ equals one,
said compositions having been calcined in air at 750°–900° C. for at least 5 minutes. These powder compositions may be formed into the desired shape and sintered in air at reduced temperatures to produce dielectric bodies of improved properties.

16 Claims, No Drawings

DIELECTRIC POWDER COMPOSITIONS

BACKGROUND OF THE INVENTION

This invention relates to dielectric compositions, and more particularly, to titanate compositions.

Discrete capacitors comprise a shaped sintered dielectric object (e.g., a disk) on which electrodes have been sintered. Leads are attached to the electrodes. The capacitors are often based upon the perovskites barium titanate and substituted barium titanate. Barium titanate sinters at high temperatures (about 1400° C.); various other titanates are sintered at high temperatures and/or in special atmospheres. Thus, N. N. Krainik et al. (Soviet Physics-Solid State, 2, 63–65, 1960) report solid solutions between, inter alia, $PbTiO_3$ and $PbMg_{0.5}W_{0.5}O_3$. Apparently a wide range of compositions, with 0–80% $PbTiO_3$, was investigated (see FIG. 2 thereof). Firing was carried out in an atmosphere of PbO vapor, which precludes practical commercial applicability. No suggestion was made as to the manufacture of multilayer capacitors. In a second article from the same laboratory, G. A. Smolenskii et al. (Soviet Physics-Solid State 3, 714, 1961) report investigating certain solid solutions, including those of Krainik et al. Firing was similarly done in PbO. Phase transistions are discussed. In what is apparently a third article in this series, A. I. Zaslavskii et al. (Soviet Physics-Crystallography 7, 577, 1963), X-ray structural studies are reported.

Brixner U.S. Pat. No. 3,472,777 discloses the manufacture of ceramic disks by a two-step firing process. Each firing step is taught to occur in the range 800°–1200° C., in air. In the sole example firing was at 1050° C. Brixner discloses various dielectric compositions such as $PbMg_{1/3}Ti_{1/3}W_{1/3}O_3$, $Pb_{0.8-0.9}Sr_{0.1-0.2}Mg_{1/3}Ti_{1/3}W_{1/3}O_3$ and Y-containing compositions.

Dielectric powder compositions capable of being fired in air (after shaping) at reduced temperatures, yet which produce high K, would permit the use of less expensive furnaces and would conserve energy and also permit the co-firing with the dielectric of low cost (but low melting) silver electrodes.

SUMMARY OF THE INVENTION

This invention involves certain finely divided (substantially all the particles are 20 microns or less in largest dimension) dielectric powder compositions which have been precalcined as specified below. These precalcined powder compositions can, after being formed into the desired shape (e.g., into disks by pressing), be fired in air at reduced temperatures to produce sintered dielectric bodies of excellent characteristics, including dissipation factor below 0.07, preferably below 0.05; density above 6.8, preferably above 8.0; and K above 1500, preferably above 3000.

The dielectric powder of this invention may contain one or more phases, and has been calcined in air at a temperature in the range 750°–900° C. for at least 5 minutes. Substantially all particles in the calcined powder are smaller than 20 microns in largest dimension. The powder has the composition

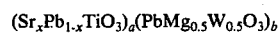

$(Sr_xPb_{1-x}TiO_3)_a(PbMg_{0.5}W_{0.5}O_3)_b$ wherein $x$ is 0–0.10, $a$ is 0.35–0.5, $b$ is 0.5–0.65, and a plus $b$ equals one. The powder may be sintered in air at temperatures in the range 900°–1050° C. to produce bodies having high dielectric constant.

In preferred powders $a$ is in the range 0.35–0.45 and $b$ is in the range 0.55–0.65. In one preferred embodiment there is no strontium, that is, $x$ is 0. In another preferred embodiment strontium is present in an amount such that $x$ is in the range 0.01–0.08. In another preferred embodiment the powder has been calcined in air for 15 minutes to 8 hours.

Also a part of this invention are disk capacitors comprising electrodes on a sintered dielectric disk, wherein the dielectric disk is that described above.

DETAILED DESCRIPTION

The calcined dielectric powder compositions of the present invention have the composition set forth above. That composition may alternately be expressed as follows:

$Sr_{0-0.10}Pb_{0.90-1.0}Ti_{0.35-0.50}Mg_{0.25-0.325}W_{0.25-0.325}O_3$, the total of (Sr and Pb) being 1.0 and the total of (Ti and Mg and W) being 1.0. More than one phase may be present in these precalcined materials, although just one phase may be present. It is well known that in dielectric materials of the perovskite structure the amount of oxygen may vary from the stoichiometric amount.

These powder compositions may be prepared from the oxides of strontium, lead, titanium, magnesium, and tungsten, or from precursors thereof such as carbonates, hydroxides, nitrates, etc. Lead, magnesium, and strontium are conveniently supplied as carbonates, whereas titanium and tungsten are conveniently supplied as oxides. Lead oxide (PbO) also is a convenient source of lead, and strontium nitrate is a convenient source of Sr. Mixtures of oxides and precursors thereof may, of course, be employed.

The oxides or precursors are mixed together using conventional technique (e.g., mortar and pestle, ball milling, etc.) and then calcined in air (or an oxygen atmosphere) at a temperature not in excess of about 900° C. Calcining much above 900° C. tends to sinter the powder excessively and can cause premature volatilization of lead. Calcining normally occurs at a temperature in the range 750°–900° C. for at least 5 minutes, preferably at least 15 minutes, and usually for 0.5–8 hours. The preferred duration of calcining will be dependent upon the particular starting materials employed, e.g., lead oxide versus lead carbonate, etc.; the proportions of starting materials; the calcining temperature; etc. As is well known, with lower temperatures longer duration of calcining will usually be employed. Calcining for more than 8 hours does not appear to cause any significant property improvements in the capacitors of this invention. Calcining may be conducted for longer than 8 hours yet still be within the purview of this invention.

Following calcining, the calcined product may then be milled to the desired fineness to break up any aggregates. Normally, the calcined product is reduced in size so that substantially all the particles are 20 microns or less in largest dimension. Usually in preferred embodiments dielectric powders will have surface areas in the range 0.2–5 m.$^2$/g.

The calcined powder will be an article of commerce available to manufacturers of capacitors. In one embodiment, the calcined powder will be pressed into a disk, sintered into a coherent, cohesive dielectric body, and then electroded (e.g., with silver electrode paste) to produce a disk capacitor using conventional techniques. Wire leads may then be attached to the electrodes.

In the present invention a principal advantage is the ability of the dielectric to be sintered in air at temperatures below 1050° C. versus 1400° C. currently used. Sintering may be conducted at higher temperatures, provided the temperature is below the melting point of the dielectric, but this, of course, minimizes furnace and energy savings. The actual sintering temperature employed depends upon the specific composition employed, the electrode composition employed, and the properties desired of the final capacitor. Sintering is conducted at a temperature in the range 900°–1050° C., for a period not less than 0.25 hour (preferably at least 0.5 hour), nor more than 4 hours. Preferred sintering temperatures are in the range 950°–1000° C.

Adequate sintering does not occur at 800° C., as seen in Showing G by virtue of low density and low K. Furthermore, at 1200° C., melting occurred (Showing H).

The calcined dielectric powder composition of this invention may also be employed to make sintered multilayer capacitors and screen printed capacitors. In the latter, alternating layers of electrode material and calcined dielectric material of this invention are printed on a substrate in the desired configuration and fired to sinter the layers into a coherent mass. The dielectric layers may comprise glass powder (e.g., up to 10% based on total weight of glass and dielectric) to improve adherence to the substrate.

EXPERIMENTAL

In the following experimental section and elsewhere in the specification and claims, all parts, percentages, ratios, and proportions are by weight, except in molecular formula or where otherwise stated.

Electroded disks of the dielectric compositions of this invention were prepared by the following general techniques. Details are set forth in the examples and comparative showing below. Reagent grade or purified grade starting materials (oxides or carbonates) indicated in the Table were either ground together in 5–10 g. sample lots in a mortar and pestle or ball milled together in about 1000 g. sample lots. The samples were then calcined in air in alumina crucibles at a temperature in the range 700°–900° C. for 1–8 hours and then reground (except for some comparative showing from which either regrinding or calcining was omitted). Samples of the resultant powder were pressed under hand pressure or at a pressure in the range 1000–4000 lbs. (454–1815 kg.) into 0.5 g. disks about 6 mm. in diameter and 2 mm. thick.

The disks were fired in a Pt boat at a temperature in the range 800°–1200° C., cooled, weighed, and subjected to various tests. Densities were calculated (the theoretical density can be determined from the composition and the lattice constant). The disks were then electroded with a silver metallization (50% Ag powder, 11% binder powder of glass, and $Bi_2O_3$, and 39% vehicle) and fired at 760° C. for 10 minutes to sinter the electrodes. The capacitance and dissipation factor (DF), not percent DF, were measured in air at one kilocycle on a General Radio automatic capacitance bridge, type 1673-A. Knowing the capacitance, dimensions of electrode, and thickness of the fired dielectric layer, effective dielectric constant (K) was determined from:

K = (Capacitance in Farads) (thickness in meters)/(area of electrode in m.$^2$) ($E_o$)

where $E_o$ is $8.82 \times 10^{-12}$ Farads/m. Usually two disks of each composition were measured and average values reported. Many of the materials were examined by an X-ray diffractometer. Each of the X-ray patterns were single-phase, essentially cubic, perovskite-like patterns.

The Table records type and quantity of starting materials, type of disk pressing (manual or press and pressure if the latter), calcining and firing conditions, and resultant composition and properties.

EXAMPLES 1–3

Comparative Showings A–B

A range of compositions of varying Ti content was prepared. The starting materials were ground in an automatic agate mortar and pestle for about an hour, then calcined and reground manually in a mortar and pestle for about a minute. Some fairly high K's were observed after firing each composition at the same temperature; maximum K was observed at about 40% Ti. With quantities of titanium lower than that of the present invention (Showings A and B) substantially lower K's were observed.

Additional quantities of these calcined products of these Examples were reground in an agate mortar and pestle for 30 minutes, and pressed at 2000 lbs. The resultant fired products yielded markedly improved properties.

EXAMPLES 4–11

A 44 mole percent Ti composition was examined as to the influence of varying disk pressing pressure and firing time at 950° C. A large batch of dielectric (1000 g.) was prepared by ball milling the starting materials for about 6 hours in a 1-gallon ball mill with porcelain balls and about 1 liter water, drying over a hot plate in air, grinding briefly by hand, calcining, and grinding by hand till substantially all the particles were 20 microns or less. The data show that the fired density was always much higher, and the DF usually considerably lower, when the powder is pressed at 4000 lbs. (1815 kg.) rather than with hand pressure, but that K is relatively unaffected. The firing time is also significant, since K increases, DF decreases and density increases with increasing firing time at 950° C. from 1 to 8 hours.

TABLE

| Example (No.)/ Showing (Letter) | Final Fired Formula (Mg = W) | Reactants (g.) $PbCO_3$ | $MgCO_3$ | $TiO_2$ | $WO_3$ | Disk Pressing Pressure (lbs.) | Density | K | DF | Calcining Time (hr.) | Temp. (° C.) | Firing Time (hr.) | Temp. (° C.) |
|---|---|---|---|---|---|---|---|---|---|---|---|---|---|
| A | $PbTi_{0.28}(Mg,W)_{0.72}O_3$ | 6.8948 | 0.8830 | 0.5772 | 2.1537 | Hand | 7.48 | 1700 | 0.030 | 8 | 800 | 1 | 950 |
| B | $PbTi_{0.33}(Mg,W)_{0.67}O_3$ | 6.9507 | 0.8234 | 0.6922 | 2.0083 | " | 7.46 | 2750 | 0.015 | " | " | " | " |
| 1 | $PbTi_{0.40}(Mg,W)_{0.60}O_3$ | 7.0167 | 0.7488 | 0.8392 | 1.8265 | " | 7.61 | 4300 | 0.036 | " | " | " | " |
| 2 | $PbTi_{0.45}(Mg,W)_{0.55}O_3$ | 7.0688 | 0.6920 | 0.9512 | 1.6866 | " | 7.79 | 4200 | 0.044 | " | " | " | " |
| 3 | $PbTi_{0.50}(Mg,W)_{0.50}O_3$ | 7.1219 | 0.6335 | 1.0647 | 1.5447 | " | 7.48 | 3600 | 0.038 | " | " | " | " |
| 4 | $PbTi_{0.44}(Mg,W)_{0.54}O_3$ | 705.83 | 69.82 | 92.87 | 171.49 | 4000 | 7.99 | 3950 | 0.034 | 8 | 800 | 1 | 950 |
| 5 | " | " | " | " | " | Hand | 7.54 | 4000 | 0.044 | " | " | " | " |
| 6 | " | " | " | " | " | 4000 | 8.07 | 4200 | 0.027 | " | " | 2 | " |

TABLE-continued

| | | | | | | | | | | | | | | |
|---|---|---|---|---|---|---|---|---|---|---|---|---|---|---|
| 7 | " | " | " | " | " | Hand | 7.65 | 4000 | 0.040 | " | " | " | " | |
| 8 | " | " | " | " | " | 4000 | 8.06 | 5100 | 0.026 | " | " | 4 | " | |
| 9 | " | " | " | " | " | Hand | 7.61 | 5150 | 0.023 | " | " | " | " | |
| 10 | " | " | " | " | " | 4000 | 8.11 | 5500 | 0.025 | " | " | 8 | " | |
| 11 | " | " | " | " | " | Hand | 7.63 | 5450 | 0.041 | " | " | " | " | |
| 12 | " | " | " | " | " | 4000 | 7.74 | 4550 | 0.019 | " | " | 1 | 1000 | |
| 13 | " | " | " | " | " | 4000 | 7.79 | 2000 | 0.031 | " | " | " | 900 | |
| 14 | " | " | 705.83 | 69.82 | 92.87 | 171.49 | 4000 | 7.40 | 2950 | 0.025 | 0.25 | 800 | 1 | 950 |
| 15 | " | " | " | " | " | " | 7.71 | 3300 | 0.024 | 0.5 | " | " | " |
| 16 | " | " | " | " | " | " | 7.89 | 3600 | 0.022 | 1 | " | " | " |
| 17 | " | " | " | " | " | " | 7.98 | 3550 | 0.023 | 2 | " | " | " |
| 18 | " | " | " | " | " | " | 8.01 | 3600 | 0.023 | 4 | " | " | " |
| 19 | " | " | " | " | " | " | 7.95 | 3750 | 0.025 | 8 | " | " | " |
| 20 | " | " | " | " | " | " | 8.01 | 3950 | 0.022 | 0.5 | " | " | " |
| 21 | " | " | " | " | " | " | 8.09 | 4000 | 0.022 | 1 | " | " | " |
| 22 | " | " | " | " | " | " | 8.11 | 4300 | 0.020 | 4 | " | " | " |
| 23 | " | " | " | " | " | " | 8.06 | 4450 | 0.026 | 8 | " | " | " |
| C | " | " | 7.0583 | 0.7033 | 0.9287 | 1.7148 | " | 6.33 | 3350 | 0.204 | 0 | — | " | " |

| Example (No.)/ Showing (Letter) | Final Fired Composition ($Mg = W$) | Reactants | | | | Disk Pressing Pressure (lbs.) | Density | K | DF | Calcining | | Firing | |
|---|---|---|---|---|---|---|---|---|---|---|---|---|---|
| | | PbO | $MgCO_3$ | $TiO_2$ | $WO_3$ | | | | | Time (Hr.) | Temp. (°C.) | Time (Hr.) | Temp. (°C.) |
| D | $PbTi_{0.25}(Mg,W)_{0.75}O_3$ | 3.2325 | 0.5165 | 0.2894 | 1.2592 | 1000 | 8.26 | 1750 | 0.001 | 8 | 800 | 1 | 950 |
| E | $PbTi_{0.30}(Mg,W)_{0.70}O_3$ | 3.2590 | 0.4859 | 0.3500 | 1.1850 | " | 8.19 | 2500 | 0.002 | " | " | " | " |
| 24 | $PbTi_{0.35}(Mg,W)_{0.65}O_3$ | 3.2861 | 0.4550 | 0.4118 | 1.1094 | " | 8.24 | 3850 | 0.005 | " | " | " | " |
| 25 | $PbTi_{0.40}(Mg,W)_{0.60}O_3$ | 3.3135 | 0.4234 | 0.4745 | 1.0327 | " | 8.03 | 5600 | 0.019 | " | " | " | " |
| 26 | $PbTi_{0.42}(Mg,W)_{0.58}O_3$ | 3.3244 | 0.4106 | 0.4999 | 1.0015 | " | 8.03 | 6950 | 0.030 | " | " | " | " |
| 27 | $PbTi_{0.44}(Mg,W)_{0.56}O_3$ | 3.3356 | 0.3979 | 0.5255 | 0.9702 | " | 8.11 | 7550 | 0.041 | " | " | " | " |
| 28 | $PbTi_{0.46}(Mg,W)_{0.54}O_3$ | 3.3470 | 0.3849 | 0.5511 | 0.9387 | " | 8.02 | 8050 | 0.047 | " | " | " | " |
| 29 | $PbTi_{0.48}(Mg,W)_{0.52}O_3$ | 3.3583 | 0.3719 | 0.5771 | 0.9070 | " | 8.03 | 7650 | 0.054 | " | " | " | " |
| 30 | $PbTi_{0.50}(Mg,W)_{0.50}O_3$ | 3.3697 | 0.3590 | 0.6032 | 0.8751 | " | 8.03 | 5600 | 0.043 | " | " | " | " |
| 31 | $PbTi_{0.4}(Mg,W)_{0.6}O_3$ | 6.6267 | 0.8429 | 0.9489 | 2.0653 | 2000 | 7.89 | 2700 | 0.030 | 8 | 800 | 5/60 | 950 |
| 32 | " | " | " | " | " | " | 7.92 | 3400 | 0.031 | " | " | 0.25 | " |
| 33 | " | " | " | " | " | " | 7.93 | 3600 | 0.032 | " | " | 0.50 | " |
| 34 | " | " | " | " | " | " | 7.97 | 4400 | 0.029 | " | " | 1 | " |
| 35 | " | " | " | " | " | " | 8.04 | 4800 | 0.028 | " | " | 2 | " |
| 36 | " | " | " | " | " | " | 8.04 | 5100 | 0.029 | " | " | 4 | " |
| 37 | $PbTi_{0.46}(Mg,W)_{0.54}O_3$ | 6.6940 | 0.7664 | 1.1022 | 1.8774 | 2000 | 8.10 | 6300 | 0.043 | 8 | 800 | 1 | 950 |
| F | " | " | " | " | " | " | 5.66 | 2950 | 0.020 | 0 | — | " | " |
| G | $PbTi_{0.40}(Mg,W)_{0.60}O_3$ | 6.6267 | 0.8429 | 0.9489 | 2.0653 | 2000 | 6.30 | 900 | 0.019 | 8 | 800 | 1 | 800 |
| 38 | " | " | " | " | " | " | 7.90 | 3800 | 0.021 | " | " | " | 900 |
| 39 | " | " | " | " | " | " | 8.08 | 5550 | 0.016 | " | " | " | 950 |
| 40 | " | " | " | " | " | " | 8.07 | 5450 | 0.010 | " | " | " | 1000 |
| 41 | " | " | " | " | " | " | 8.00 | 5100 | 0.008 | " | " | " | 1100 |
| H | " | " | " | " | " | " | SAMPLE MELTED | | | " | " | " | 1200 |

| Example (No.)/ Showing (Letter) | Final Fired Composition ($Mg = W$) | Reactants (g.) | | | | | Disk Pressing Pressure (lbs.) | Density | K | DF | Calcining | | Firing | |
|---|---|---|---|---|---|---|---|---|---|---|---|---|---|---|
| | | PbO | $SrCO_3$ | $MgCO_3$ | $TiO_2$ | $WO_3$ | | | | | Time (Hr.) | Temp. (°C.) | Time (Hr.) | Temp. (°C.) |
| 42 | $PbTi_{0.35}(Mg,W)_{0.65}O_3$ | 3.2861 | — | 0.4550 | 0.4118 | 1.1094 | 2000 | 8.24 | 3850 | 0.005 | 8 | 800 | 1 | 950 |
| 43 | " | " | — | " | " | " | " | 8.11 | 3600 | 0.001 | " | " | " | 1000 |
| 44 | " | " | — | " | " | " | " | 7.19 | 2600 | 0.003 | " | " | " | 1050 |
| 45 | $PbTi_{0.40}(Mg,W)_{0.60}O_3$ | 3.3135 | — | 0.4234 | 0.4745 | 1.0327 | " | 8.03 | 5600 | 0.019 | " | " | " | 950 |
| 46 | " | " | — | " | " | " | " | 8.11 | 5250 | 0.015 | " | " | " | 1000 |
| 47 | " | " | — | " | " | " | " | 7.19 | 3800 | 0.007 | " | " | " | 1050 |
| 48 | $PbTi_{0.45}(Mg,W)_{0.55}O_3$ | 3.3470 | — | 0.3849 | 0.5511 | 0.9387 | " | 8.02 | 8050 | 0.047 | " | " | " | 950 |
| 49 | " | " | — | " | " | " | " | 8.08 | 7600 | 0.036 | " | " | " | 1000 |
| 50 | " | " | — | " | " | " | " | 6.87 | 3900 | 0.015 | " | " | " | 1050 |
| 51 | Pb | 6.6488 | — | 0.8212 | 0.9998 | 2.0031 | 2000 | 8.17 | 6050 | 0.034 | 8 | 800 | 1 | 950 |
| 52 | $Pb_{0.98}Sr_{0.02}$ | 6.5455 | 0.0883 | 0.8250 | 1.0043 | 2.0122 | " | 8.14 | 5000 | 0.021 | " | " | " | " |
| 53 | $Pb_{0.96}Sr_{0.04}$ | 6.4409 | 0.1777 | 0.8288 | 1.0088 | 2.0213 | " | 8.11 | 4050 | 0.014 | " | " | " | " |
| 54 | $Pb_{0.94}Sr_{0.06}$ $Ti_{0.42}$ | 6.3355 | 0.2676 | 0.8326 | 1.0134 | 2.0305 | " | 8.04 | 3350 | 0.012 | " | " | " | " |
| 55 | $Pb_{0.92}Sr_{0.08}$ $(Mg,$ | 6.2291 | 0.3583 | 0.8363 | 1.0181 | 2.0399 | " | 7.90 | 3050 | 0.005 | " | " | " | " |
| 56 | $Pb_{0.90}Sr_{0.10}$ $W)_{0.58}O_3$ | 6.1219 | 0.4498 | 0.8403 | 1.028 | 2.0493 | " | 7.80 | 2600 | 0.005 | " | " | " | " |
| 57 | Pb | 6.6940 | — | 0.7664 | 1.1022 | 1.8774 | 2000 | 8.10 | 5050 | 0.035 | 8 | 850 | 1 | 950 |
| 58 | $Pb_{0.99}Sr_{0.01}$ | 6.6420 | 0.0444 | 0.7678 | 1.1048 | 1.8818 | " | 8.26 | 6100 | 0.037 | " | " | " | " |
| 59 | $Pb_{0.98}Sr_{0.02}$ | 6.5898 | 0.0888 | 0.7698 | 1.1072 | 1.8860 | " | 8.06 | 6350 | 0.034 | " | " | " | " |
| 60 | $Pb_{0.96}Sr_{0.04}$ $Ti_{0.46}$ | 6.4848 | 0.1788 | 0.7730 | 1.1122 | 1.8946 | " | 8.18 | 5500 | 0.019 | " | " | " | " |
| 61 | $Pb_{0.94}Sr_{0.06}$ $(Mg,$ | 6.3792 | 0.2694 | 0.7768 | 1.1174 | 1.9034 | " | 7.59 | 4450 | 0.015 | " | " | " | " |
| 62 | $Pb_{0.98}Sr_{0.02}$ $W)_{0.54}O_3$ | 6.2720 | 0.3608 | 0.7804 | 1.1226 | 1.9122 | " | 7.80 | 3850 | 0.006 | " | " | " | " |
| 63 | $Pb_{0.90}Sr_{0.10}$ | 6.1642 | 0.4530 | 0.7838 | 1.1278 | 1.9210 | " | 7.40 | 3250 | 0.006 | " | " | " | " |
| 64 | $Pb_{0.96}Sr_{0.04}Ti_{0.46}$ $(Mg,W)_{0.54}O_3$ | 6.4848 | 0.1788 | 0.7730 | 1.1122 | 1.8946 | 2000 | 8.02 | 4350 | 0.015 | 8 | 800 | 1 | 950 |
| I | " | " | " | " | " | " | " | 5.15 | 2050 | 0.011 | 0 | — | " | " |
| 65 | $Pb_{0.90}Sr_{0.10}Ti_{0.46}$ $(Mg,W)_{0.54}O_3$ | 6.1642 | 0.4530 | 0.7838 | 1.1278 | 1.9210 | " | 7.85 | 3300 | 0.008 | 8 | 800 | " | " |
| J | " | " | " | " | " | " | " | 5.58 | 1700 | 0.002 | 0 | — | " | " |

| | Final Fired | | | | | Disk Pressing Pres- | | | | Calcining | | Duration of Firing at 950° C. |

TABLE-continued

| Ex. No. | Composition (Mg = W) | Class (g.) | PbCO$_3$ | SrCO$_3$ | MgCO$_3$ | TiO$_3$ | WO$_3$ | sure (Lb.) | Density | K | DF | Time (Hr.) | Temp. (° C.) | Time (Hr.) |
|---|---|---|---|---|---|---|---|---|---|---|---|---|---|---|
| 66 | Pb$_{0.96}$Sr$_{0.04}$Ti$_{0.42}$ (Mg,W)$_{0.58}$O$_3$ | — | 23.9473 | 0.5517 | 2.5738 | 3.1329 | 6.2769 | 4000 | 7.60 | 3350 | 0.015 | 8 | 750 | 1 |
| 67 | " | — | " | " | " | " | " | " | 7.75 | 3600 | 0.011 | " | 800 | " |
| 68 | " | — | " | " | " | " | " | " | 7.95 | 3850 | 0.011 | " | 850 | " |
| 69 | " | — | " | " | " | " | " | " | 7.90 | 4100 | 0.016 | " | 900 | " |
| 70 | PbTi$_{0.44}$-(Mg,W)$_{0.56}$O$_3$ | 0 | 705.83 | — | 69.82 | 92.87 | 171.49 | 4000 | 7.64 | 3850 | 0.20 | 8 | 800 | 10/60 |
| 71 | " | 5 | " | — | " | " | " | " | 7.76 | 1400 | 0.14 | " | " | " |
| 72 | " | 0 | " | — | " | " | " | " | 8.06 | 4500 | 0.04 | " | " | 1 |
| 73 | " | 5 | " | — | " | " | " | " | 7.68 | 1600 | 0.06 | " | " | " |

EXAMPLES 12-13

The composition and experimental procedures of Examples 4-11 were again used, but the firing temperature was changed to 900° C. (Ex. 12) and 1000° C. (Ex. 13). These results should be compared with those in Example 4, otherwise identical except for 950° C. firing in Example 4. The sample fired at 1000° C. showed increased K, significantly decreased DF but decreased density as compared with that fired at 950° C. That fired at 900° C. showed markedly decreased K and decreased density, but DF was unaffected.

EXAMPLES 14-19

The composition of Examples 4-11 (44 mole percent Ti) was used to investigate the effect of varying calcining duration. Another large batch was prepared exactly as described for Examples 4-11, except that the duration of calcining at 800° C. was varied as shown in the Table; the firing duration at 950° C. was held constant at 1 hour. The data show that for this composition and calcining temperature, the best dielectric properties result upon calcining for 4 hours. The data show that calcining for as little as 15 minutes gave a useful dielectric.

EXAMPLES 20-23

Examples 15, 16, 18, and 19 are repeated exactly, except that after calcining, the product was ground for about 30 minutes in an automatic agate mortar and pestle before pressing to produce a finer powder than used in Examples 15, 16, 18, and 19, where grinding had been done by hand. The data show that with more finely ground powder, a considerable improvement can result. K and density increased and DF decreased versus Examples 15, 16, 18, and 19.

Comparative Showing C

A 44 mole percent Ti composition was prepared by grinding the reagents in an automatic mortar and pestle for an hour. Calcining was omitted. A pellet was pressed and electroded. A marked deterioration in properties occurred. The density was markedly decreased, and DF was markedly increased. K appeared to have been relatively unaffected.

EXAMPLES 24-30

Comparative Showings D-E

A range of dielectric compositions comprising from 25 to 50 mole percent Ti was investigated. PbO was used as a reactant instead of PbCO$_3$. Small samples were prepared by grinding the reagents in an automatic agate mortar and pestle for about an hour, then calcining, and regrinding in an agate mortar and pestle for about 30 minutes. A dramatic improvement in K and density resulted. A lower disk pressing pressure was used.

EXAMPLES 31-36

The procedure of Examples 24-30 was used. The composition PbTi$_{0.4}$Mg$_{0.3}$W$_{0.3}$O$_3$ was used to test the effect of varying firing duration at 950° C. on a sample made with PbO as the starting material was studied. The data showed that while DF was relatively insensitive to firing time, K continued to increase with increasing duration of firing. The density also increased up to 2 hours, then appeared to remain constant to 4 hours. Note also that even after only 5 minutes a respectable dielectric resulted.

EXAMPLE 37

Showing F

Employing the procedure of Examples 24-30 and a 46 mole percent Ti composition, the effect of removing the calcining step on a batch made with PbO starting material was examined. The data showed a very marked decrease in density and K, although DF appeared to be decreased as well.

EXAMPLES 38-41

Showings G and H

Using the procedure of Examples 24-30 and a composition of 40 mole percent Ti, the effect of firing temperature was studied. The data show that (1) 800° C. is too low as judged by the low K and density; (2) 1200° C. is too high since melting occurred; (3) the optimum sintering temperature appears to be in the range 950°-1000° C. Even at 900° C., a respectable dielectric resulted.

EXAMPLES 42-50

Using the procedure of Examples 24-30 and three different compositions, the effect of higher (950°-1050° C.) firing temperatures upon properties was examined. The data show that: (1) densities decreased drastically when firing temperatures were raised from 1000° C. to 1050° C.; (2) K's decreased when firing temperature was raised from 950° C. to 1000° C. to 1050° C., especially from 1000° to 1050° C.; (3) density decreased when firing temperatures were raised from 950° C. to 1000° C. for low Ti content, but increased slightly for high Ti content; (4) DF appeared to decrease somewhat when firing temperatures were raised from 950° C. to 1000° C. to 1050° C., but sometimes it increased (Example 44).

In summary, these data suggest that 950° C. is an emminently suitable firing temperature, depending on the composition and the dielectric parameter (K or DF) being emphasized. Note also that these results pertain to an arbitrarily chosen 1-hour firing duration; Examples 31-36 showed that increased duration of firing at 950° C. lead to improved properties. In terms of process time

EXAMPLES 51-56

The composition $PbTi_{0.42}Mg_{0.29}W_{0.29}O_3$ and the procedure of Examples 24-30 were used to examine the effect of substituting up to 10 mole percent Sr for Pb. The data show that good dielectric properties can be obtained. With this 42 mole percent Ti composition, although k decreased with increasing Sr substitution, DF decreased at a much faster rate, making these compositions attractive for applications where reduced DF is required.

EXAMPLES 57-63

A 46 mole percent Ti composition was found to have a very high K at room temperature (K of 8050 in Example 28); the procedure of Examples 24-30 was used. The Pb in this composition was substituted with up to 10 mole percent Sr. Contrary to what was observed in Examples 55-60 with 42 mole percent Ti compositions, Sr substitution increased K. The properties of some of these solid solutions are quite impressive, e.g., in Example 60 after sintering for only 1 hour at 950° C., there was observed a K of 5500, DF of 0.019, and greater than 90% of theoretical density.

The example run with no strontium (Example 57) showed reduced K compared to the same composition in a previous set of examples (Example 28). This illustrates the effect of batch-to-batch nonuniformity, presumably caused by small differences in synthesis technique from one set of examples to another. However, within one set of examples which are always handled together to minimize nonuniformity, the relative values of K and DF should indicate trends, although the absolute intrinsic values could be considerably higher.

EXAMPLES 64-65

Showings I-J

Using the procedure of Examples 24-30 and two Sr-containing compositions, elimination of the calcining step resulted in a dramatic drop in K and density.

EXAMPLES 66-69

Using the procedure of Examples 1-3 and $PbCO_3$ as a starting material, the composition $Pb_{0.96}Sr_{0.04}Ti_{0.42}Mg_{0.29}W_{0.29}O_3$ was used to show the influence of varying calcining temperature, while holding calcining duration at 8 hours. The data show that for this composition made with $PbCO_3$, 850° C. is the optimum calcining temperature.

EXAMPLE 70-73

Each of these examples illustrates the use of the dielectric compositions of the present invention as a disk capacitor. Another capacitor configuration wherein these compositions may be used is in thick film or printed capacitors, wherein successive multiple electrode and dielectric layers may be printed on a dielectric substrate and fired to produce a capacitor. In this embodiment, glass may be added to improve adherence to substrate, but the introduction of glass (which has a much lower K than the dielectric compositions of this invention) usually reduces K.

To demonstrate the feasibility of using mixtures of the dielectric with glass, pressed disks of a dielectric composition of this invention, containing 95% of a 44 mole percent Ti dielectric and 5% of a low-melting glass (68.4% PbO, 13.0% $B_2O_3$, 9.3% CdO, 9.3% $SiO_2$) were fired at 950° C. for 10 minutes and for 1 hour. Glass-free dielectric was also fired side-by-side for comparison. In order to assure a fully reacted dielectric, the calcined powder (same batch used for Examples 4-11) was pressed into a slug and fired to 950° C. for 1 hour before mixing with the glass. It was then ground by hand in a mortar and pestle till substantially all the particles were 20 microns or less, reground with glass in an agate mortar and pestle for about 15 minutes, and pressed at 4000 lbs. before firing, electroding with Ag, etc., in the usual way. The data show that, although a decrease in K is observed, DF usually decreased when glass was added. This suggests that the dielectric is compatible with low melting glasses and could function well in a screen printable dielectric system.

We claim:

1. A finely divided dielectric powder calcined in air at a temperature in the range 750°-900° C. for at least 5 minutes, the powder having the composition $$(Sr_xPb_{1-x}TiO_3)_a(PbMg_{0.5}W_{0.5}O_3)_b$$

wherein
 $x$ is 0-0.10,
 $a$ is 0.35-0.5,
 $b$ is 0.5-0.65, and
 $a$ plus $b$ equals one,
substantially all the powder particles being 20 microns or less in largest dimension, said powder being sinterable in air at temperatures in the range 900°-1050° C. to produce bodies having high dielectric constant.

2. A powder according to claim 1 wherein $a$ is in the range 0.35-0.45 and $b$ is in the range 0.55-0.65.

3. A powder according to claim 1 wherein $x$ is 0.

4. A powder according to claim 2 wherein $x$ is 0.

5. A powder according to claim 1 wherein $x$ is in the range 0.01-0.08.

6. A powder according to claim 2 wherein $x$ is in the range 0.01-0.08.

7. A powder according to claim 1 which has been calcined in air for 15 minutes to 8 hours.

8. A powder according to claim 1 having a surface area in the range 0.2-5 m.$^2$/g.

9. A disk capacitor, sintered in air at a temperature in the range 900°-1150° C., comprising electrodes on a sintered dielectric disk, wherein the dielectric disk is of the composition of claim 1.

10. A disk capacitor, sintered in air at a temperature in the range 900°-1150° C., comprising electrodes on a sintered dielectric disk, wherein the dielectric disk is of the composition of claim 2.

11. A disk capacitor comprising electrodes on a sintered dielectric disk, wherein the dielectric disk is of the composition of claim 3.

12. A disk capacitor comprising electrodes on a sintered dielectric disk, wherein the dielectric disk is of the composition of claim 4.

13. A disk capacitor comprising electrodes on a sintered dielectric disk, wherein the dielectric disk is of the composition of claim 5.

14. A disk capacitor comprising electrodes on a sintered dielectric disk, wherein the dielectric disk is of the composition of claim 6.

15. A disk capacitor comprising electrodes on a sintered dielectric disk, wherein the dielectric disk is of the composition of claim 7.

16. A disk capacitor comprising electrodes on a sintered dielectric disk, wherein the dielectric disk is of the composition of claim 8.

* * * * *